United States Patent
Hauptmann et al.

(10) Patent No.: US 6,947,478 B1
(45) Date of Patent: Sep. 20, 2005

(54) ANALOGUE ECHO FILTER

(75) Inventors: Joerg Hauptmann, Wernberg (AT); Frederic Pecourt, Mouans-Sartoux (FR); Aner Tenen, Petach Tikva (IL)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 09/890,751

(22) PCT Filed: Feb. 4, 2000

(86) PCT No.: PCT/DE00/00349

§ 371 (c)(1),
(2), (4) Date: Dec. 3, 2001

(87) PCT Pub. No.: WO00/46936

PCT Pub. Date: Aug. 10, 2000

(Under 37 CFR 1.47)

(30) Foreign Application Priority Data

Feb. 5, 1999 (DE) .......................................... 199 04 856

(51) Int. Cl.[7] .............................. H04B 1/38; H04L 5/16
(52) U.S. Cl. ........................ 375/222; 375/257; 370/286; 379/406.01

(58) Field of Search ................................. 375/219, 222, 375/223, 285, 257, 258; 370/276, 282, 285, 286, 289, 290; 379/3, 406.01, 406.05

(56) References Cited

U.S. PATENT DOCUMENTS

| 4,608,464 A | | 8/1986 | Morikawa et al. |
| 4,635,255 A | * | 1/1987 | Clark et al. .................. 370/524 |
| 4,796,296 A | | 1/1989 | Amada et al. |

FOREIGN PATENT DOCUMENTS

| EP | 0 798 876 A | 10/1997 |

\* cited by examiner

*Primary Examiner*—Don N. Vo
(74) *Attorney, Agent, or Firm*—Welsh & Katz, Ltd.

(57) ABSTRACT

The invention relates to an analog echo filter for a modem, to which an analog transmit signal is supplied. According to the invention, a passive analog input filter and an active analog filter, whose transfer function is adjustable, are provided. The transfer function of the active analog filter can preferably be switched between a first-order transfer function and a second-order transfer function.

3 Claims, 2 Drawing Sheets

ANALOGUE ECHO FILTER

The present invention relates to an analog echo filter as claimed in the preamble of patent claim 1, and as is known from U.S. Pat. No. 4,608,464.

U.S. Pat. No. 4,796,296 discloses a PCM coder and decoder whose function is two-wire/four-wire conversion. This document also describes the use of a passive input filter.

When transmitting signals via a two-wire line, using a modem, which transmits signals in full-duplex, analog echo filters are used to suppress echoes in the received signal. An echo is produced by superimposition of the frequency bands of the transmitted and received signal. An analog echo filter simulates the line impedance of the two-wire line, and is connected between the transmit and receive path. A signal to be transmitted, on which the line echo results in a signal to be received having interference superimposed on it, is supplied to the analog echo filter and is filtered depending on the line impedance of the two-wire line. The output signal from the analog echo filter is then more or less similar to the echo contained in the signal to be received, and is subtracted from the signal to be received, for echo suppression. Thus, for effective echo suppression, the echo filter has to simulate the line impedance of the transmission line as well as possible (this is also referred to as balancing; echo filters are therefore also referred to as balancing filters). Echo suppression is of major importance for the achievement of a high data transmission rate, particularly for high-speed data modems which operate using an xDSL transmission method (for example ADSL, HDSL).

In order to satisfy these stringent requirements, the echo filter is formed, for example, by an echo filter which is constructed completely from passive components and whose impedance should correspond as well as possible to the line impedance of the two-wire line. In some cases, analog echo filters are also used for coarse matching of the echo damping, with digital filters being used in conjunction with analog/digital converters and digital/analog converters for fine adjustment. Such an echo filter is known, for example from WO 93/04539. This describes an echo filter which can be digitally matched to different line impedances. However, the solution is highly complex and the adaptability of the echo filter is limited by the resolution of the analog/digital converters.

The technical problem on which the invention is based is thus to specify an analog echo filter which can be matched to different line impedances and, at the same time, can be produced at low cost.

This problem is solved by an analog echo filter for a modem having the features of patent claim 1. Advantageous refinements are specified in the respective dependent claims.

The invention relates to an analog echo filter for a modem, to which an analog transmit signal is supplied. According to the invention, a passive analog input filter and an active analog filter, whose transfer function is adjustable, are provided. The transfer function of the active analog filter can preferably be switched between a first-order transfer function and a second-order transfer function. This advantageously allows the transfer function, and hence the echo damping, to be matched to different transmission lines. In one particularly preferred embodiment, the passive analog input filter comprises resistors and capacitors. The active analog filter preferably has operational amplifiers, resistors, capacitors and switches. The simple design capability, using analog components, is advantageous in this case. A further advantage results from the capability to adjust the analog echo filter precisely. It is particularly preferable for the active analog filter to have three operational amplifiers, which are connected in series, with the first operational amplifier and the second operational amplifier in the series circuit having capacitors, which each feed back the outputs to the inputs of an operational amplifier. The second operational amplifier in the series circuit can preferably be bridged by switches in order to set a first-order transfer function for the active analog filter. This embodiment can advantageously be implemented easily in the form of an integrated circuit, thus resulting in considerable cost advantages over an embodiment using discrete components.

Further advantages, features, and application options for the invention result from the following description of exemplary embodiments in conjunction with the drawing, in which:

FIG. 1 shows a block diagram with the components which are essential for the invention. The illustrated block diagram in this case corresponds to the transmit and receive part of an ADSL modem.

Figure 1:
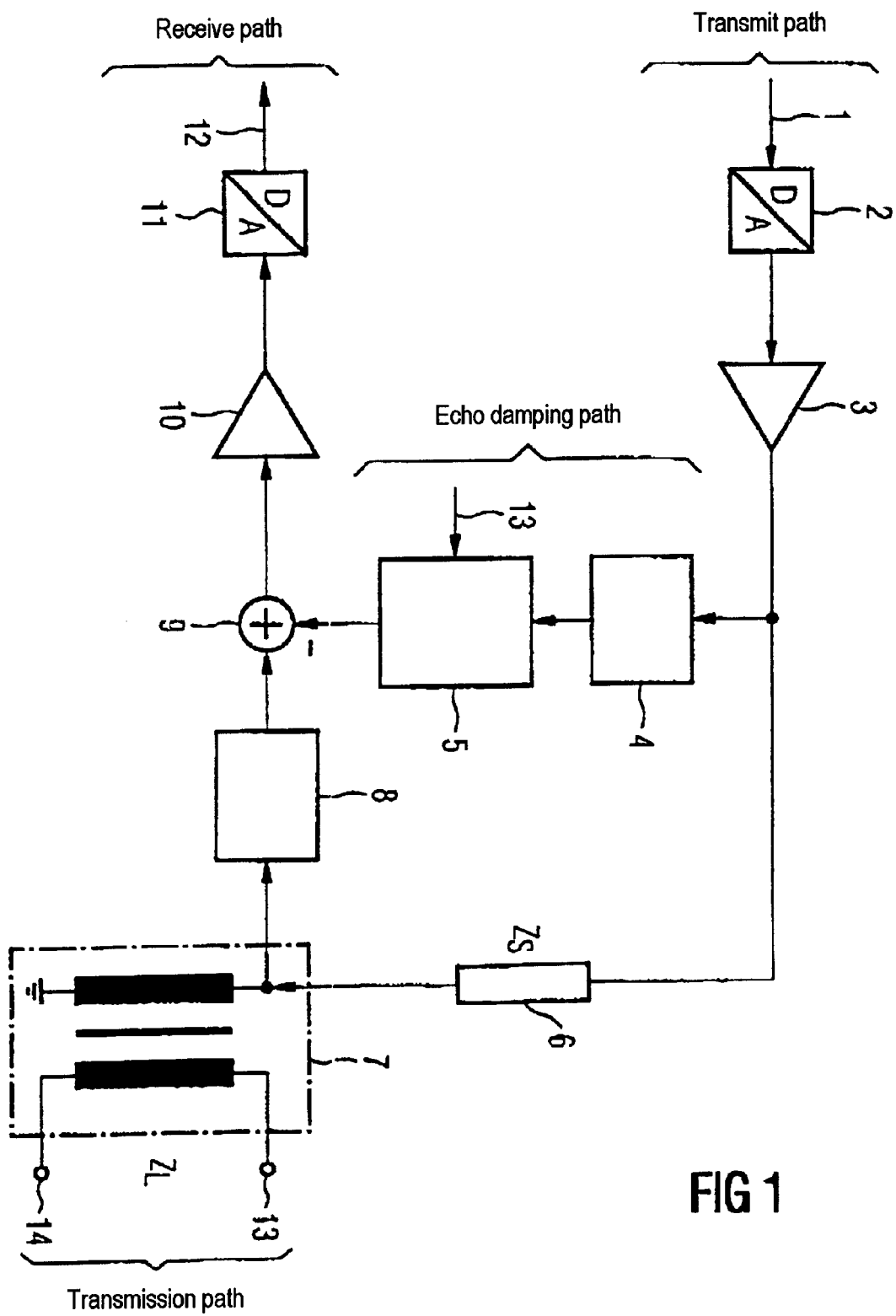
FIG. 1 shows a block diagram of the analog echo filter according to the invention.

The transmit and receive part of a modem has a transmit path, a receive path, an echo damping path for suppressing the echo contained in the received signal, and a hybrid circuit for separating and combining the transmit and receive signals.

In the transmit path, a digital transmit signal 1 is supplied to a digital/analog converter 2, which converts the digital transmit signal to an analog transmit signal.

The analog transmit signal is supplied to an amplifier 3, which amplifies the signal to a level required for transmission.

The amplified analog transmit signal is supplied firstly to an analog input filter 4, which is connected in the echo damping path, and secondly to an impedance 6 (ZS).

The analog input filter is used for initial balancing of the echo damping path and for setting a terminating impedance for the analog hybrid circuit.

The output signal from the analog input filter 4 is supplied to an active analog adaptable echo filter 5. The adaptable active analog echo filter 5 can be set to different line impedances, via control lines 13.

The output signal from the analog active adjustable echo filter 5 is supplied to a subtraction circuit 9, and is subtracted from an analog received signal, which is processed in the receive path.

The analog received signal is filtered out of a signal on a two-wire line by an analog hybrid circuit 7.

To this end, the analog hybrid circuit 7 which, illustrated in simplified form, consists of a transformer, can be connected on the line side via two connections 13 and 14 to a two-wire transmission line. The two-wire transmission line together with an opposite end between the two connections 13 and 14 forms a line impedance ZL which is transformed by the transformer to the transmit path, the echo damping path and the receive path. The analog received signal is filtered by an analog input filter 8 and is supplied to the subtraction circuit 9. An echo-filtered received signal is produced at the output of the subtraction circuit 9, and is supplied to an amplifier circuit with automatic gain control 10.

The amplifier circuit with automatic gain control 10 amplifies the echo-filtered received signal to a level which makes full use of the resolution of a downstream analog/digital converter 11.

The analog/digital converter 11 converts the echo-filtered analog received signal to a digital received signal 12.

In order to provide as efficient echo suppression as possible for the analog received signal, the transfer function of the active analog echo filter 5 is adjustable. A first-order or second-order transfer function has been found to be useful for effective echo damping 5. The advantage of a first-order or second-order transfer function furthermore includes the fact that it can be implemented comparatively easily using operational amplifiers, resistors and capacitors.

The first-order transfer function is as follows:

$$H_1(p) = \frac{a_1 \cdot p + a_0}{b_1 \cdot p + b_0}$$

The second-order transfer function is as follows:

$$H_2(p) = \frac{a_2 \cdot p^2 + a_1 \cdot p + a_0}{b_2 \cdot p^2 + b_1 \cdot p + b_0}$$

Figure 2:
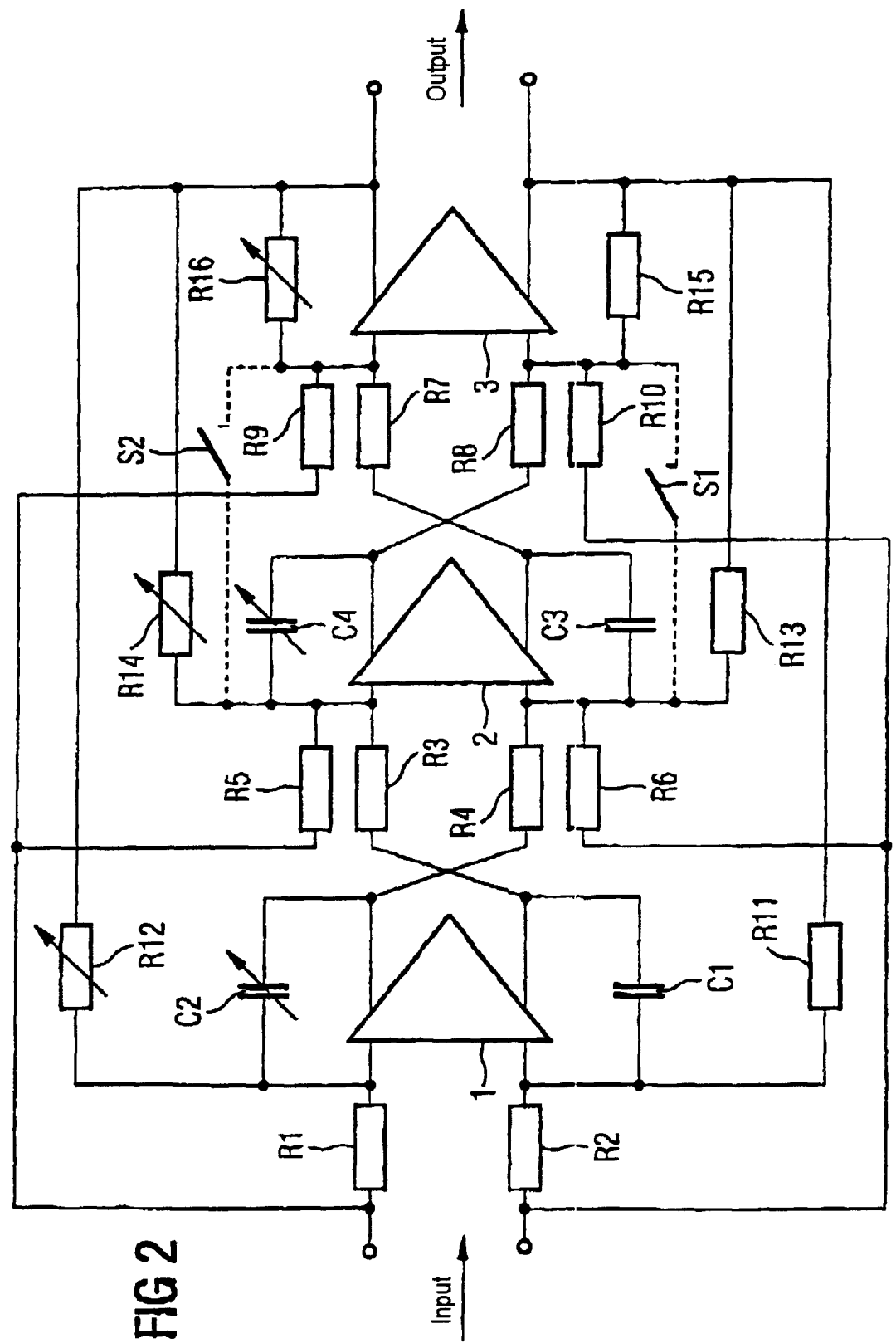
FIG. 2 shows an exemplary embodiment of the analog echo filter according to the invention.

FIG. 2 shows an exemplary embodiment of the active analog adjustable echo filter.

The illustrated circuit has three differential operational amplifiers, 1, 2 and 3. Each of the differential operational amplifiers is preceded by respective input resistors R1, R2; R3, R4 and R7, R8, respectively. The operational amplifiers 1 and 2 are each fed back via respective capacitances C1, C2 and C3, C4. The feedback capacitance C2 of the operational amplifier 1, and the feedback capacitance C4 of the operational amplifier 2, are adjustable for matching of the transfer function of the echo filter. The third operational amplifier 3 is fed back via resistors R15, R16. The resistor R16 is in this case adjustable.

An input signal to the analog active echo filter is supplied to the first operational amplifier 1, to the second operational amplifier 2 via resistors R5 and R6 and to the third operational amplifier 3 via resistors R9 and R10.

The inputs of the second operational amplifier S2 can be connected via switches S1 and S2 to the inputs of the third operational amplifier 3. This allows the second operational amplifier to be bridged, and to be switched from a second-order transfer function $H_2(p)$ to a first-order transfer function $H_1(p)$.

In addition, the inputs of the first operational amplifier are connected to the outputs of the analog echo filter via resistors R11 and R12, and the inputs of the second operational amplifier are connected to the outputs of the analog echo filter via resistors R13 and R14. The resistors R12 and R14 are in this case adjustable for matching the transfer function of the analog echo filter.

This exemplary embodiment can advantageously be implemented with comparatively little complexity as an integrated circuit. Integrated digital circuits can in this case be used to control the resistors R12, R14, R16, the capacitances C2, C4 and the switches S1, S2. The analog echo filter can thus be controlled very easily.

What is claimed is:

1. An analog echo filter for an echo damping path of a modem, which is located between a transmit path and a receive path, in which case the modem can be supplied with an analog transmit signal, which is transmitted in full-duplex via a transmission line, via the transmit path, with the modem having an analog hybrid circuit for separating and combining the transmit signal and a received signal which can be output via the receive path, and having an active analog filter, whose transfer function is adjustable, wherein a passive analog input filter is provided for input balancing of the echo damping path and for adjusting a terminating impedance for the analog hybrid circuit;

the transfer function of the active analog filter can be switched between a first-order transfer function and a second-order transfer function;

the active analog filter has three operational amplifiers, which are connected in series; and the second operational amplifier in the series circuit can be bridged by switches in order to switch the active analog filter from a second-order transfer function to a first-order transfer function.

2. The analog echo filter as claimed in claim 1 wherein the passive analog input filter comprises resistors and capacitors.

3. The analog echo filter as claimed in claim 1, wherein the first operational amplifier and the second operational amplifier in the series circuit have capacitors which respectively feed back the outputs to the inputs of an operational amplifier.

\* \* \* \* \*